United States Patent Office 2,985,672
Patented May 23, 1961

2,985,672

17 ALPHA-HALOGENATED-11,21-DIOXYGEN-ATED-4-PREGNENE-3,20-DIONES AND DERIVATIVES

Charles Robert Engel, Sillery, Quebec, Canada, assignor, by mesne assignments, to Canadian Patents and Development Limited, Ottawa, Ontario, Canada, a company No Drawing. Filed Aug. 27, 1958, Ser. No. 757,458

24 Claims. (Cl. 260—397.45)

The present invention relates to 17 alpha-halo derivatives of gluco-corticoids, in particular, 17 alpha-halogenated - 11,21-dioxygenated-4-pregnene-3,20-diones and derivatives.

It is an object of this invention to provide a group of compounds which are biologically active, exhibiting interesting corticoid potencies.

The compounds of the present invention may be illustrated by the following structural formula:

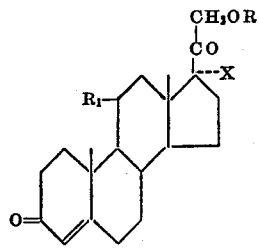

wherein X represents halogen, in particular, bromine and 17 alpha-halo-21-hydroxy-4-pregnene-3,11,20-triones and their 21-ester derivatives.

This application is a continuation-in-part application of U.S. application Serial No. 694,091, filed November 4, 1957.

The invention pertains to 11,21-dioxygenated products which from a biological point of view means that the products described in the present disclosure are derivatives of biologically active gluco-corticoids. This differentiates the products from the substances described in the patents by the Upjohn Company which deal with 17-halo derivatives of 11 alpha-hydroxy- and 11-oxo-progesterone, which contain no oxygen function in position 21 and which, furthermore, are not derived from products exhibiting marked gluco-corticoid activity. From a chemical point of view, the difference between the products described in this application and in the Upjohn patents is thus evident. From the point of view of processes necessary for the production of the products claimed in this disclosure, the following difference between this application and the Upjohn patents is emphasized: the presence of an hydroxy function or an acyloxy function in position 21 has a marked influence on halogenations in position 17. Therefore, special procedures, as outlined hereafter, for the introduction of a halogen function in position 17 have to be employed when a 21-hydroxy function or one of its derivatives is present.

A series of representative reactions leading to 17-halogenated hormone analogues of the gluco-corticoid group, in particular of 17-brominated and chlorinated derivatives, may be graphically illustrated as follows:

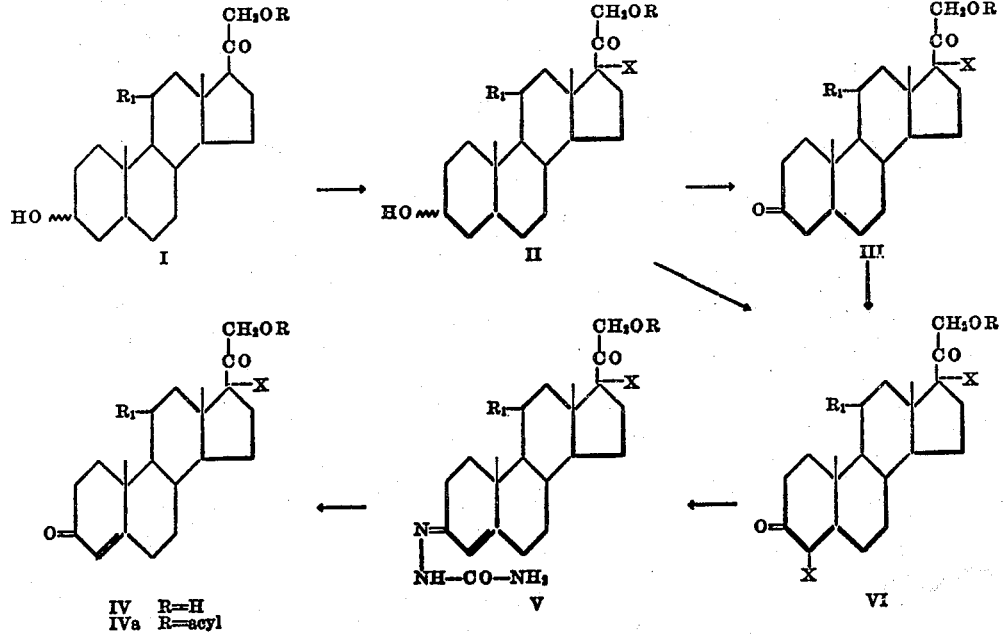

chlorine; R is H, alkyl-CO, aryl-CO, cycloalkyl-CO, tosyl, mesyl, alkyl, cycloalkyl, aryl, and other derivatives of a 21-hydroxy function; and $R_1$ is beta-OH, =O (ketonic oxygen), alkyl-COO, aryl-COO, cycloalkyl-COO, tosyloxy, mesyloxy, and other derivatives of a beta-hydroxy function.

NAMES OF PRODUCTS 17 alpha-halo-11 beta-21-dihydroxy-4-pregnene-3,20-diones and their 11- and 21-ester derivatives;

wherein
X=halogen, in particular Br, Cl;
R=H, alkyl-CO, aryl-CO, and other acyl derivatives of a 21 hydroxy function;
$R_1$=beta-OH, =O (ketonic oxygen), and acyl derivatives of a beta-hydroxy function.

NAMES OF FINAL PRODUCTS 17 alpha-halo-11 beta, 21 dihydroxy-4-pregnene-3,20-diones and their 11- and 21-ester derivatives;

17 alpha-halo-21-hydroxy-4-pregnene-3,11,20-triones and their 21-ester derivatives.

A 3 alpha-hydroxy-11,21-dioxygenated pregnane-20-one of the general Formula I, in which R and $R_1$ have the values and significances indicated in the graphical reproduction, is halogenated in a suitable solvent, such as acetic acid, chloroform, or other halogenated solvents such as chlorinated alkanes, with one mole of halogen. With bromine the reaction can be completed rapidly, that is, within about fifteen minutes if the temperature be in the range of about 40° C. to 80° C. If the temperature be below 40° C., say between 20° C.–40° C., the reaction occurs over a prolonged period of from about one to about six hours. With chlorine it is not necessary to elevate the temperature to complete the reaction rapidly. The resulting halide II is oxidized with a suitable oxidizing agent, such as chromic acid in acetic acid, or in acetone in the presence of sulfuric acid, or with the chromic acid-pyridine complex, or with an oxidizing agent such as N-bromoacetamide, N-chloroacetamide, N-bromosuccinimide, N-chlorosuccinimide, to a 3,20-dione of the general Formula III. This compound is halogenated with one mole of bromine, respectively chlorine, to a dihalide of the general Formula VI; such a dihalide of the general Formula VI can also be obtained directly from the 3-hydroxy-17-monohalide II by oxydation with simultaneous halogenation by the use of an agent such as N-bromoacetamide, N-chloroacetimide, or N-chlorosuccinimide and N-bromosuccinimide. The dihalide of general Formula VI is transformed in the usual way via the 3-semicarbazone V to an ester derivative IVa of the desired 17 alpha-halo-11,21-dioxygenated-4-pregnene-3,20-dione, which is hydrolized in an acid medium to an 11-oxygenated 21-hydroxy-4-pregnene-3,20-dione of the general Formula IV in which R has the value H and $R_1$ the value =O, beta-OH. When a starting material is used with the same general structure as depicted in Formula I but in which the 3 alpha-hydroxy group is esterified, the halogenation to a product analogous to II is effected as described above but the free 3 alpha-hydroxy group has to be liberated prior to the following oxidation, for instance by total hydrolysis of all ester groups and by subsequent partial esterification in position 21.

The following examples are illustrative of the process and resulting products of the present invention but are not to be construed as limiting.

EXAMPLE 1

*17 alpha-bromo-21-hydroxy-4-pregnene-3,11,20-trione*

The synthesis is graphically illustrated by a series of representative reactions, as follows:

DESCRIPTION OF THE EXPERIMENT

*17 alpha-bromo-3 alpha-hydroxy-21-acetoxy-pregnane-11,20-dione (VIII)*

To a solution of 3.282 g. of crystalline 3 alpha-hydroxy-21-acetoxy-pregnane-11,20-dione (VII), in 75 cc. of glacial acetic acid were added two drops of a 25% hydrogen bromide solution in acetic acid and, subsequently, with stirring, over a period of 12 minutes 15.36 cc. of a 1.28 M bromine solution in acetic acid. The first two drops of this bromine solution were added at room temperature, subsequently the mixture was heated to 45° whereupon discoloration took place; the rest of the bromine solution was added at 45°. After completion of this addition, the heating was discontinued and the mixture was stirred for another 7 minutes. The solution was now poured into ice-water and the crystalline precipitate representing crude VIII, filtered and washed with distilled water. Recrystallization from ether afforded 2.5 g. of pure bromide (VIII).

*17 alpha-bromo-21-acetoxy-pregnane-3,11,20-trione (IX)*

A solution of 2.4 g. of the above described 3-hydroxy bromide VIII in 1.25 cc. of acetic acid was treated at 17° with a solution of 569 mg. of chromic acid in 5.7 cc. of 90% acetic acid for 14 hours; 10 cc. of methanol was added and the mixture poured into 3 liters of water. The precipitate was filtered, chromatographed on silica gel and recrystallized. Thus, there was obtained 1.6 g. of pure bromotriketone IX.

*4 beta, 17 alpha-dibromo-21-acetoxy-pregnane-3,11,20-trione (X)*

To a solution of 1.5 g. of 17 alpha-bromo-21-acetoxy-pregnane-3,11,20-trione (IX) in 40 cc. of acetic acid were added at room temperature, 2 drops of a 25% hydrogen bromide solution in acetic acid, and subsequently, dropwise and with stirring, 256 mg. of bromine in 3.2 cc. of acetic acid. The reaction product was precipitated with water, filtered and the residue was washed repeatedly and dried. Recrystallization from methylene chloride-methanol afforded 900 mg. of dibromide (X). The mother liquors were debrominated in the usual fashion with zinc and acetic acid to give 340 mg. of completely debrominated 21-acetoxy-pregnane-3,11,20-trione.

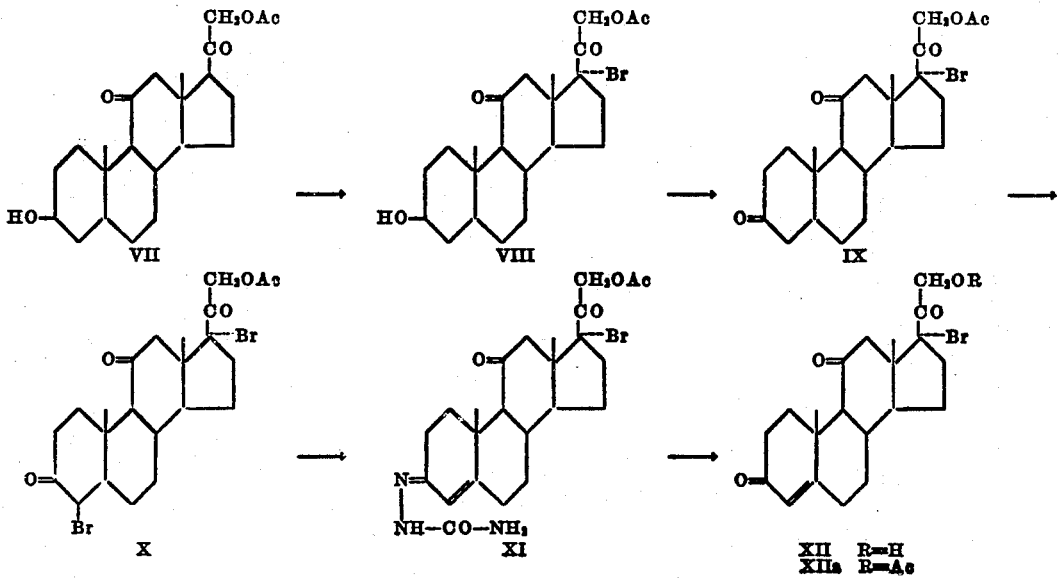

17 alpha-bromo-21-acetoxy-4-pregnene-3,11,20-trione (XIIa)

A solution of 800 mg. of the above described dibromide X was dissolved in 28 cc. of absolute, alcohol-free chloroform and 45 cc. of dry t-butyl alcohol and the air was displaced with carbon dioxide. To the mixture was added 255 mg. of recrystallized semicarbazide base, and the flask was flushed with carbon dioxide, sealed and shaken repeatedly. After 125 minutes, unreacted semicarbazide was removed by filtration, and the filtrate was taken to dryness in vacuo. To the residue, 35 cc. of ethanol and 3 cc. of water were added, and the solution was reduced in vacuo at 45° to 130 cc. After dilution with a further 250 cc. of water the mixture was cooled to —10°. The precipitate was filtered and washed repeatedly and dried, in vacuo. Thus, 860 mg. of the crude semicarbazone IX was obtained. The product was dissolved in 25 cc. of acetic acid and 9 cc. of water and the air was displaced with carbon dioxide. There was added 2 cc. of an aqueous 1.66 N pyruvic acid solution and the flask was flushed with carbon dioxide and sealed. After 16 hours the mixture was poured into water and extracted with ether. The organic solution was washed with iced sodium bicarbonate and sodium carbonate solutions, cold dilute hydrochloric acid, iced bicarbonate solution and water and was dried. Removal of the solvent afforded 830 mg. of an amorphous product which was chromatographed on 50 g. of silica gel. Thus there was obtained 510 mg. of 17 alpha-bromo-11-dehydro-corticosterone-acetate (XIIa).

17 lapha-bromo-21-hydroxy-4-pregnene-3,11,20-trione (XII)

Acetate XIIa (500 mg.) was dissolved in 19 cc. of absolute methanol containing 190 mg. of hydrogen chloride and the solution was kept in a nitrogen atmosphere for 24 hours. The usual working up afforded 240 mg. of crystalline 17 alpha-bromo-21-hydroxy-4-pregnene-3,11,20-trione (XII).

EXAMPLE 2

17 alpha-bromo-3 alpha-hydroxy-21-acetoxy-pregnane-11,20-dione. (*An intermediate in the synthesis of 17 alpha-bromo-21-hydroxy-4-pregnene-3,11,20-trione*)

To a solution of 545 mg. of 3 alpha-hydroxy-21-acetoxy-pregnane-11,20-dione (VII) in 50 cc. of chloroform there was added, dropwise and with stirring, over a period of 2.5 hours, at 30° C., 224 mg. of bromine dissolved in 15 cc. of carbon tetrachloride. Subsequently the practically colorless solution was washed with a cold sodium bicarbonate solution and with water, dried over sodium sulfate and taken to dryness in vacuo, at 15 to 20°. Upon trituration with methanol, the residue (660 mg.) crystallized. Recrystallization from ether afforded pure 17 alpha-bromo-3 alpha-hydroxy-21-acetoxy-pregnane-11,20-dione (VIII).

EXAMPLE 3

17 alpha-bromo-21-hydroxy-4-pregnene-3,11,20-trione

The synthesis is graphically illustrated by a series of representative reactions as follows:

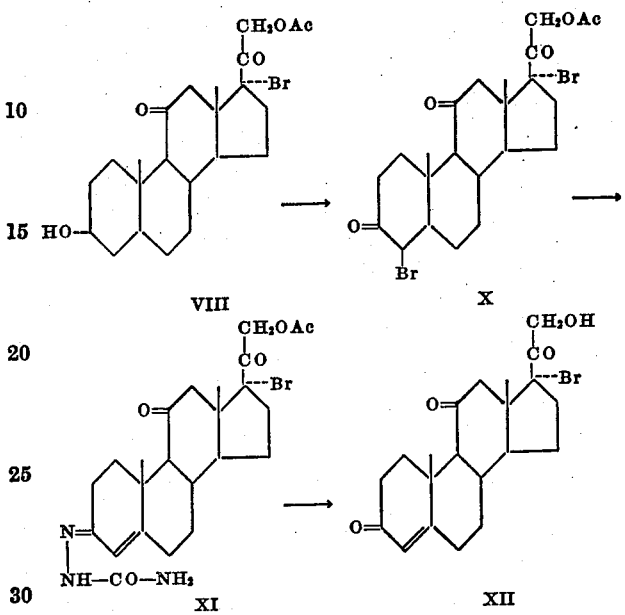

*4 beta, 17 alpha-dibromo-21-acetoxy-pregnane-3,11,20-trione (X) from 17 alpha-bromo-3-alpha-hydroxy-21-acetoxy-pregnane-3,11,20-trione (VIII)*

To a solution of 5 g. of 17 alpha-bromo-3 alpha-hydroxy-21-acetoxy-pregnane-3,11,20-trione (X) prepared from 3 alpha-hydroxy-21-acetoxy-pregnane-3,11,20-trione (VIII) as described in Example 1, in 90 cc. of dry-t-butanol, there was added 9.68 g. of N-bromosuccinimide dissolved in 100 cc. of methylene chloride in 80 cc. of t-butanol. The mixture was kept at room temperature for 18 hours. Subsequently, the slightly yellow solution was illuminated for two minutes with a photo-flood lamp. The now colorless solution was cooled and diluted with methylene chloride. The solution was washed with an iced dilute sodium bisulfite solution, with water, dried over sodium sulfate and taken to dryness in vacuo. The residue was recrystallized from methylene chloride-methanol to afford 3.5 g. of dibromide X.

The above described dibromide X was converted in accordance with the method described in Example 1 to the desired 17 alpha-bromo-21-hydroxy-4-pregnene-3,11,20-trione (XII).

EXAMPLE 4

17 alpha-chloro-21-hydroxy-4-pregnene-3,11,20-trione

The synthesis is graphically illustrated by a series of representative reactions as follows:

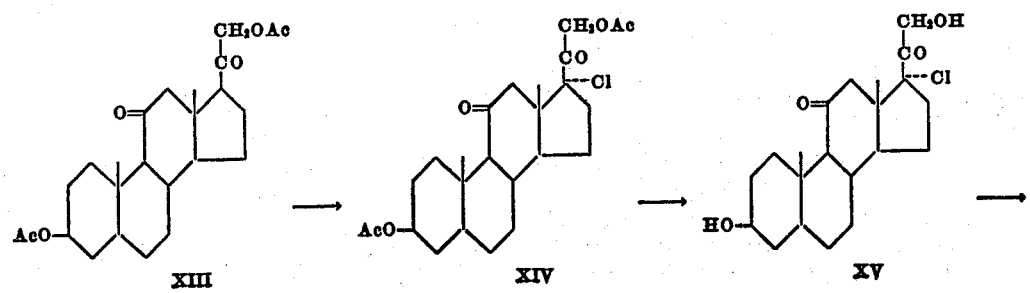

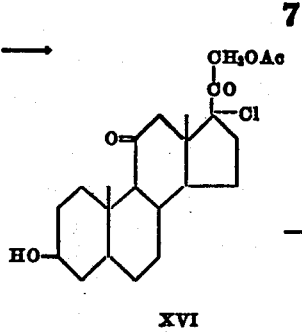
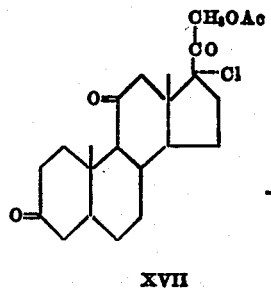
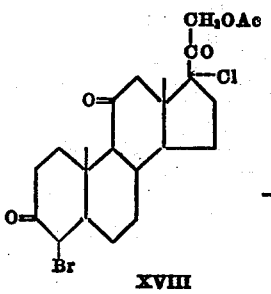

XVI  XVII  XVIII

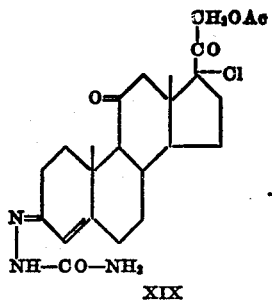
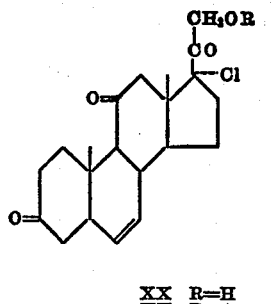

XIX  XX  R=H
     XXa R=Ac

*17 alpha-chloro-3 alpha,21-diacetoxy-pregnane-11,20dione (XIV)*

A solution of 15 g. of 3 alpha,21-acetoxy-pregnane-11,-20-dione (XIII), in 300 cc. of acetic acid was treated at room temperature with 3 drops of a 20% hydrogen chloride solution in acetic acid and was subsequently chlorinated at 25° with a solution of 1.23 g. of chlorine in 35 cc. of acetic acid. The duration of the chlorination was 13 minutes. The solution was cooled and poured into water. The precipitated material was extracted with methylene chloride, the organic solution was washed with iced sodium bicarbonate solution and with water, dried and taken to dryness in vacuo. The residue yielded upon recrystallization 7.2 g. of pure chloride XIV.

*17 alpha-chloro-3 alpha-hydroxy-21-acetoxy-pregnane-11,20-dione (XVI)*

The above described chloride XIV (7.2 g.) was dissolved in 400 cc. of absolute methanol containing 4 g. of hydrogen chloride. The solution was kept at room temperature for 24 hours in a nitrogen atmosphere and was subsequently poured into ice-water. The precipitate, representing crude dihydroxy chloride XV, was collected, washed and dried. The product (6.05 g.) was dissolved without further purification in 25 cc. of pyridine and acetylated in the usual fashion, at room temperature, with 1.565 g. of acetic anhydride. The usual working up afforded 6.5 g. of an amorphous reaction product. Chromatography on 230 g. of aluminum oxide and recrystallization yielded 2.9 g. of pure mono-acetate XVI.

*17 alpha-chloro-21-acetoxy-pregnane-3,11,20-trione (XVII)*

A solution of 2.9 g. of the above described mono-acetate XVI in 170 cc. of acetic acid was treated at 18° with a solution of 760 mg. of chromic acid in 7.6 cc. of acetic acid. After 17 hours, the excess oxidizing agent was destroyed by addition of 10 cc. of methanol and the mixture was poured into ice-water. The reaction product was filtered, washed and dried; thus there was obtained 2.4 g. of the triketone XVII.

*4 beta-bromo-17 alpha-chloro-21-acetoxy-pregnane-3,11,20-trione (XVIII)*

A solution of 2.2 g. of 17 alpha-chloro-21-acetoxy-pregnane-3,11,20-trione (XVII) was brominated in the usual fashion in acetic acid with one mole equivalent of bromine. The reaction product was recrystallized from methylene chloride-ether-hexane to yield 1.4 g. of 4-bromo-17-chlorotriketone XVIII.

*17 alpha-chloro-21-acetoxy-4-pregnene-3,11,20-trione (XXa)*

The 4-bromide XVIII (1.5 g.) was transformed in a fashion analogous to the one described in Example 1, through the semicarbazone XIX, to the 21-acetate XXa of 17 alpha-chloro-21-hydroxy-4-pregnene-3,11,20-trione in 80% yield.

*17 alpha-chloro-21-hydroxy-4-pregnene-3,11,20-trione (XX)*

A solution of 1 g. of acetate XXa, in 45 cc. of absolute methanol containing 450 mg. of hydrogen chloride was kept at room temperature in a nitrogen atmosphere for 30 hours. The usual working up afforded 550 mg. of 17-alpha-chloro-21-hydroxy-pregnane-3,11,20-trione (XX).

EXAMPLE 5

*17 alpha-chloro-3 alpha,21-diacetoxy-pregnane-11,20-dione*

(An intermediate in the synthesis of 17 alpha-chloro-21-hydroxy-4-pregnene-3,11,20-trione as described in Example 3.)

The synthesis is graphically illustrated by a series of representative reactions as follows:

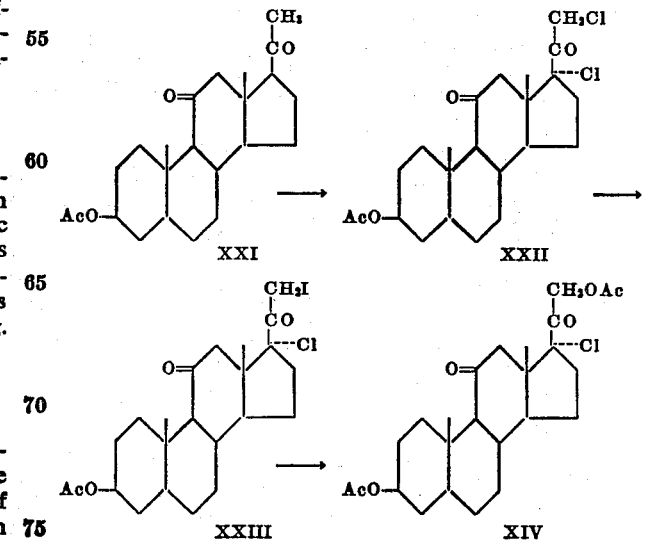

XXI  XXII
XXIII  XIV

A solution of 3 alpha-acetoxy-pregnane-11,20-dione (XXI) in acetic acid is treated with 2 molecular equivalents of chlorine in acetic acid, subsequently to the addition of a small amount of hydrogen chloride in acetic acid. Out of the reaction mixture, the corresponding 17,-21-dichloride XXII was isolated and transformed in the usual fashion by treatment with sodium iodide in boiling absolute acetone to the corresponding 21-iodo-17-chloride XXIII. Acetoxylation of the latter with potassium acetate over a prolonged period gave among other products the desired 17 alpha-chloro-3 alpha,21-diacetoxy-pregnane-11,20-dione (XIV).

EXAMPLE 6

*17 alpha-bromo-corticosterone (17 alpha-bromo-11 beta, 21-dihydroxy-4-pregnene-3,20-dione*

The synthesis is graphically illustrated by a series of representative reactions as follows:

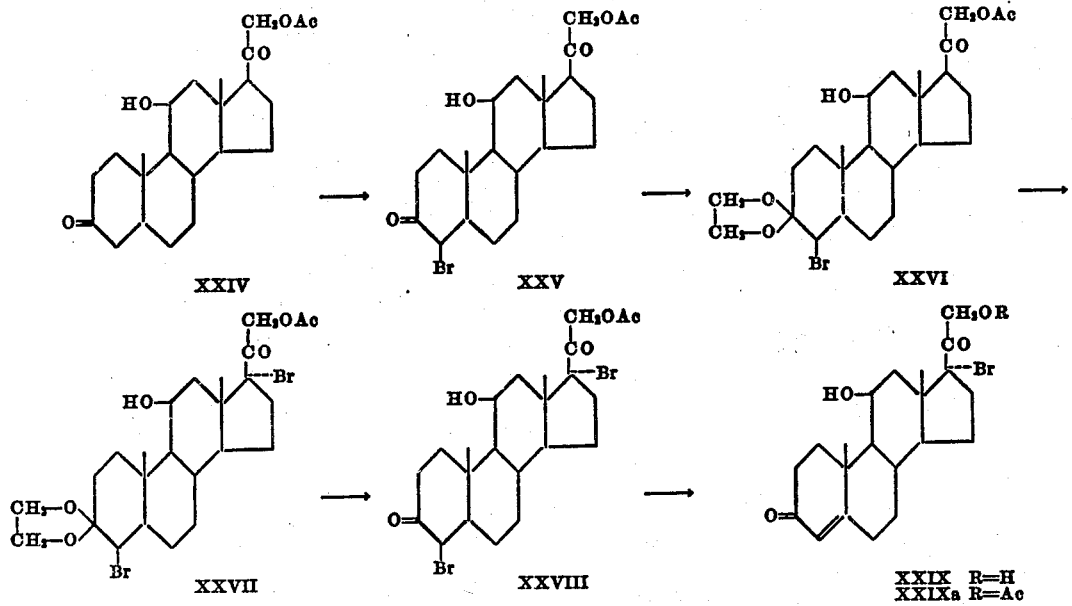

*4 beta-bromo-21-acetoxy-11 beta-hydroxy-pregnane-3,20-dione (XXV)*

A quantity (12 g.) of 21-acetoxy-11 beta-hydroxy-pregnane-3,20-dione (XXIV) was brominated in the usual fashion, with one molecular equivalent of bromine in acetic acid, yielding 7.1 g. of monobromide XXV, while 3.5 g. of starting material XXIV was recovered by the usual debromination with zinc and acetic acid.

*4 beta-bromo-21-acetoxy-11 beta-hydroxy-pregnane-3,20-dione-3-ethylene ketal (XXVI)*

The above described 4-bromide XXV was dissolved in 175 cc. of alcohol-free chloroform and 70 cc. of freshly distilled anhydrous ethylene glycol and there was added 700 mg. of p-toluenesulfonic acid and 7 g. of freshly sublimed selenium dioxide. The mixture was stirred with exclusion of moisture in a nitrogen atmosphere for 62 hours, diluted with chloroform and the organic solution was washed with iced carbonate solution, iced 1 N hydrochloric acid and with water and was dried. The solvent was removed in vacuo and the residue was dissolved in 20 cc. of pyridine and treated with 10 cc. of acetic anhydride. After 18 hours the mixture was worked up in the usual fashion to yield 6.5 g. of a yellow oil which was chromographed on 200 g. of aluminum oxide. There were obtained 2.8 g. of ketal XXVI.

*4 beta, 17 alpha-dibromo-21-acetoxy-11 beta-hydroxy-pregnane-3,20-dione (XXVIII)*

A quantity of the above described bromo-ketal XXVI (2.2 g.) was dissolved in 40 cc. of acetic acid and brominated with 343 mg. of bromine in 2.5 cc. of acetic acid, to which had been added 100 mg. of potassium acetate in 0.1 cc. of water. After the usual working up, the reaction product was dissolved in 200 cc. of absolute acetone and the solution was flushed with carbon dioxide. Subsequently, there was added 280 mg. of p-toluenesulfonic acid. The air was again displaced with carbon dioxide, and the flask was sealed and kept for 46 hours at room temperature. The usual working up afforded 1.9 g. of crude XXVIII which was chromatographed on silica gel. There was obtained 1.1 g. of pure dibromide XXVIII.

*17 alpha-bromo-corticosterone (XXIX)*

The dibromide XXVIII (1.1 g.) was converted in the usual way, via the 3-semicarbazone, to 17 alpha-bromo-corticosterone acetate (XXIXa) (600 mg. of pure product), which in turn was hydrolized with hydrogen chloride in methanol to yield 380 mg. of 17 alpha-bromo-corticosterone (XXIX).

The compounds which are subject to halogenation in position 17 can be represented by the following formula:

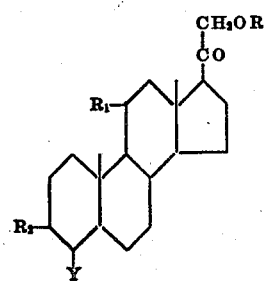

Y=H, Br, Cl.

Examples 1, 2, and 3 above describe halogenation in position 17, $R_2$ having the value OH. In Examples 4 and 5, the value for $R_2$ is AcO and in Example 6, $R_2$ has the value

R and $R_1$ as throughout the specification.

Since many modifications of the foregoing reactions are possible, the invention is not intended to be limited by the examples shown but only by the scope of the following claims:

What is claimed is:
1. 17 alpha - halogenated - 11,21-dioxygenated-4-pregnene-3,20-diones having the formula:

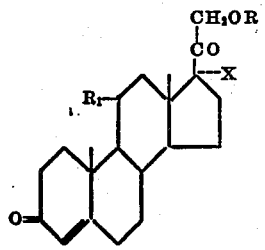

wherein X is a member of the group consisting of bromine and chlorine;
R is a member of the group consisting of H and hydrocarbon acyl; and
$R_1$ is a member of the group consisting of beta-OH, =O (ketonic oxygen) and beta-hydrocarbon acyloxy.
2. Compounds as described in claim 1 wherein X is bromine.
3. Compounds as described in claim 1 wherein X is chlorine.
4. 17 alpha-halo-21-hydroxy-4-pregnene-3,11,20-triones and their 21-acetyl derivatives having the formula:

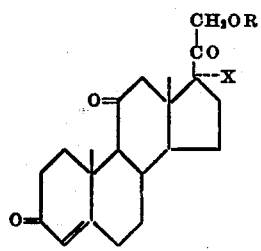

wherein X is a member of the group consisting of bromine and chlorine, and
R is a member of the group consisting of H and acetyl.
5. Compounds as described in claim 4 wherein X is bromine.
6. Compounds as described in claim 4 wherein X is chlorine.
7. 17 alpha-bromo-21-hydroxy-4-pregnene-3,11,20-trione.
8. 17 alpha-chloro-21-hydroxy-4-pregnene-3,11,20-trione.
9. 17 alpha-halo-11 beta, 21-dihydroxy-4-pregnene-3,20-dione and its 11- and 21-ester derivatives having the formula:

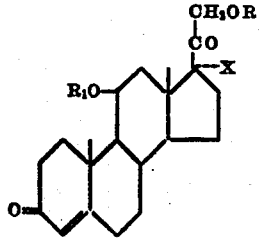

wherein X is a member of the group consisting of bromine and chlorine;
R is a member of the group consisting of H and hydrocarbon acyl; and
$R_1O$ is a member of the group consisting of beta-OH and beta-hydrocarbon acyloxy.
10. Compounds as described in claim 9 wherein X is bromine.
11. Compounds as described in claim 9 wherein X is chlorine.

12. A compound as described in claim 9 wherein X is bromine and R and $R_1$ are both hydrogen.
13. A compound as described in claim 9 wherein X is chlorine and R and $R_1$ are both hydrogen.
14. 17 alpha-bromo-11 beta, 21-dihydroxy-21-acetoxy-4-pregnene-3,20-dione.
15. 17 alpha-chloro-11 beta, 21-dihydroxy-4-pregnane-3,20-dione.
16. A method comprising the halogenation in position 17-alpha of a 3,11,21-trioxygenated-pregnane-20-one of the following formula:

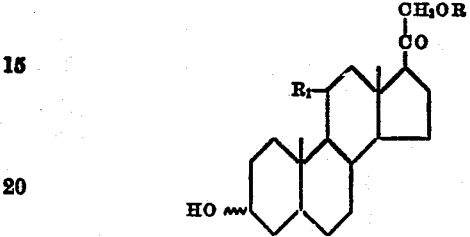

wherein R is a member of the group consisting of H and hydrocarbon acyl, and
$R_1$ is a member of the group consisting of beta-OH, =O (ketonic oxygen) and beta-hydrocarbon acyloxy;
by treatment with one molecular equivalent of halogen in a solvent of one of the group consisting of acetic acid, chloroform, methylene chloride and halogenated alkanes, yielding the corresponding 17-alpha-halide; and by conversion of the 17-halogenated derivative to a compound of the following formula:

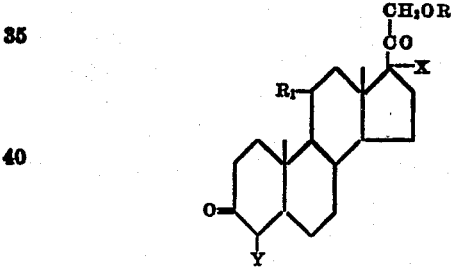

wherein X and Y are members of the group consisting of bromine and chlorine;
R is a member of the group consisting of H and hydrocarbon acyl; and
$R_1$ is a member of the group consisting of beta-OH, =O (ketonic oxygen) and beta-hydrocarbon acyloxy;
by oxidation with an agent of one of the group consisting of chromic acid, N-bromoacetamide, N-chloroacetamide, N-bromosuccinimide, N-chlorosuccinimide, and by halogenation with an agent of one of the group consisting of bromine, chlorine, N-bromoacetamide, N-chloroacetamide, N-bromosuccinimide, N-chlorosuccinimide; and in the conversion of this 4,17-dihalide to a compound of the following formula:

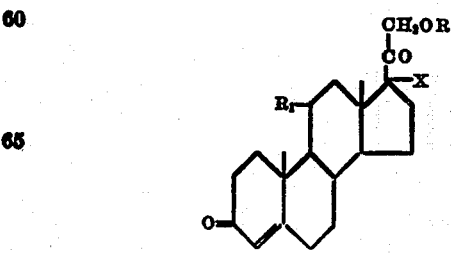

wherein X, R and $R_1$ are as above defined by reaction with an agent of one of the group consisting of semicarbazide, dinitrophenylhydrazine and subsequent hydrolysis of the formed 3-keto derivative to the free 3-ketone by the action of an acidic agent; and in the subsequent hydrolysis of ester groups to yield a compound of the following formula:

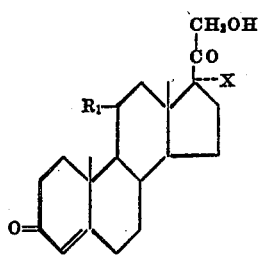

wherein X is a member of the group consisting of bromine and chlorine, and $R_1$ is a member of the group consisting of beta-OH and =O (ketonic oxygen).

17. The process for the production of a 17 alpha-chloro-21-oxygenated 4-pregnene-3,20-dione of the following formula:

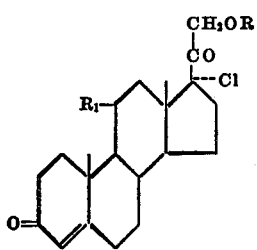

wherein R is a member of the group consisting of H and hydrocarbon acyl, and $R_1$ is a member of the group consisting of beta-OH, =O (ketonic oxygen) and beta-hydrocarbon acyloxy; by treatment of a 17-alpha-chloro-21-halo-pregnane-20-one of the following formula:

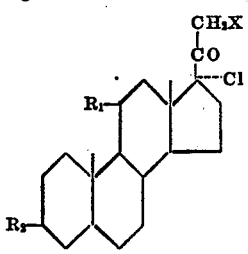

wherein X is a member of the group consisting of bromine and chlorine;

$R_2$ is a member of the group consisting of —OH, hydrocarbon acyloxy, and =O (ketonic oxygen); and $R_1$ is a member of the group consisting of beta-OH, =O (ketonic oxygen) and beta-hydrocarbon acyloxy with an alkali iodide of one of the group consisting of sodium iodide, potassium, iodide, lithium iodide to yield a compound of the following formula:

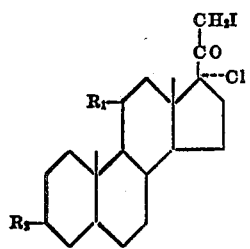

wherein $R_2$ and $R_1$ are as above defined and by subsequent replacement of the iodine atom of this compound by an acetate group by treatment with an alkali acetate of one of the group consisting of potassium acetate and sodium acetate, to yield the corresponding 17-alpha-chloro-21-acetoxy-pregnane-20-one; and by the conversion of this product to the desired 17-alpha-chloro-11, 21-dioxygenated-4-pregnene-3,20-dione, according to the method outlined in claim 16 wherein X is chlorine.

18. A method as described in claim 16, wherein X is bromine.

19. A method as described in claim 16, wherein X is chlorine.

20. A method comprising the halogenation in position 17-alpha of a 3,11,21-trioxygenated-pregnane-20-one of the following formula:

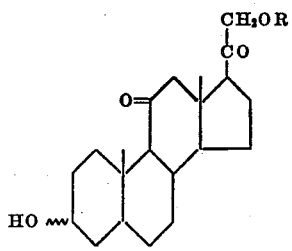

wherein R is a member of the group consisting of H and hydrocarbon acyl; by treatment with one molecular equivalent of halogen in a solvent of one of the group consisting of acetic acid, chloroform, methylene chloride and halogenated alkanes, yielding the corresponding 17-alpha-halide thereafter converting same to a compound of the following formula:

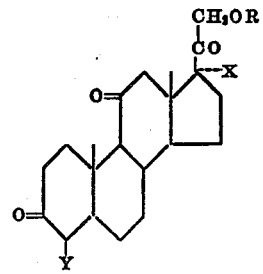

wherein X and Y are members of the group consisting of bromine and chlorine, and R is a member of the group consisting of H and hydrocarbon acyl by oxidation with an agent of one of the group consisting of chromic acid, N-bromoacetamide, N-chloroacetamide, N-bromosuccinimide, N-chlorosuccinimide, and by halogenation with an agent of one of the group consisting of bromine, chlorine, N-bromoacetamide, N-chloroacetamide, N-bromosuccinimide, N-chlorosuccinimide; and in the conversion of this 4,17-dihalide to a compound of the following formula:

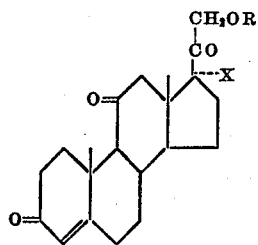

wherein X and R are as above defined by reaction with an agent of one of the group consisting of semicarbazide, dinitrophenylhydrazine and subsequent hydrolysis of the formed 3-keto derivative to the free 3-ketone by the action of an acidic agent; and in the subsequent hydrolysis of ester groups in position 21 to yield a compound of the following formula:

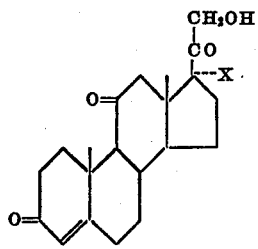

wherein X is as above defined.

21. A method as described in claim 20 wherein X is bromine.

22. A method as described in claim 20 wherein X is chlorine.

23. 17-alpha-bromo-11-beta, 21-dihydroxy-4-pregnene 3,20 dione.

24. 17-alpha-chloro-11-beta, 21-dihydroxy-21-acetoxy-4-pregnene 3,20 dione.

References Cited in the file of this patent
UNITED STATES PATENTS 2,705,720    Lyttle ------------------ Apr. 5, 1955